(12) United States Patent
Tucci

(10) Patent No.: US 8,762,678 B2
(45) Date of Patent: *Jun. 24, 2014

(54) CONFIGURABLE AND SCALABLE STORAGE SYSTEM

(71) Applicant: Archion, Inc., Burbank, CA (US)

(72) Inventor: James A. Tucci, Burbank, CA (US)

(73) Assignee: Archion, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/908,873

(22) Filed: Jun. 3, 2013

(65) Prior Publication Data

US 2013/0339602 A1 Dec. 19, 2013

Related U.S. Application Data

(63) Continuation of application No. 12/107,689, filed on Apr. 22, 2008, now Pat. No. 8,458,430, which is a continuation of application No. 12/056,158, filed on Mar. 26, 2008, now abandoned.

(60) Provisional application No. 60/908,159, filed on Mar. 26, 2007.

(51) Int. Cl.
| | | |
|---|---|---|
| *G06F 13/00* | (2006.01) | |
| *G06F 13/28* | (2006.01) | |
| *G06F 9/26* | (2006.01) | |
| *G06F 9/34* | (2006.01) | |

(52) U.S. Cl.
USPC ..... 711/170; 711/114; 711/203; 711/E12.084

(58) Field of Classification Search
None
See application file for complete search history.

(56) References Cited

U.S. PATENT DOCUMENTS

| 6,877,011 B2 | 4/2005 | Jaskiewicz |
| 2002/0156987 A1 | 10/2002 | Gajjar et al. |
| 2005/0071596 A1 | 3/2005 | Aschoff et al. |
| 2005/0161752 A1 | 7/2005 | Seigler |
| 2006/0161752 A1* | 7/2006 | Burkey ........................ 711/170 |

* cited by examiner

*Primary Examiner* — Eric S Cardwell
(74) *Attorney, Agent, or Firm* — John K. Fitzgerald; Fulwider Patton LLP

(57) ABSTRACT

The system utilizes a plurality of layers to provide a robust storage solution. One layer is the RAID engine that provides parity RAID protection, disk management and striping for the RAID sets. The second layer is called the virtualization layer and it separates the physical disks and storage capacity into virtual disks that minor the drives that a target system requires. A third layer is a LUN (logical unit number) layer that is disposed between the virtual disks and the host. By using this approach, the system can be used to represent any number, size, or capacity of disks that a host system requires while using any configuration of physical RAID storage.

8 Claims, 4 Drawing Sheets

CONFIGURABLE AND SCALABLE STORAGE SYSTEM

CROSS-REFERENCES TO RELATED APPLICATIONS

This application claims priority from U.S. application Ser. No. 12/107,689, filed Apr. 22, 2008, now U.S. Pat. No. 8,458,430, issued Jun. 4, 2013, which is a continuation of Ser. No. 12/056,158, filed Mar. 26, 2008, now abandoned, which claims priority to U.S. Provisional Application No. 60/908,159, filed Mar. 26, 2007, which is incorporated herein in its entirety.

BACKGROUND

A SAN (storage array network) is a storage system designed to attach mass storage units, such as disk drives or tape drives, to servers oil a computer network. The SAN is sometimes referred to as a "fabric". The storage device may sometimes be an array of disks known as a RAID array. RAID stands for Redundant Array of Inexpensive Disks. SAN is distinguished from Network-attached storage (NAS) which is the name given to dedicated data storage technology that can be connected directly to a computer network to provide centralized data access and storage to heterogeneous network clients. A SAN uses block level access so that it appears as locally attached storage to device drivers and application software.

The growth of computer networks and the need for high capacity storage is growing with the rise of media applications and web 2.0 environments. It would be useful to take advantage of some of the features of storage systems such as SAN systems, file sharing systems, and others, in these and other emerging, high storage requirement environments. However, there are a number of disadvantages with applying this technology in current configurations.

One current solution is a so called "turn-key" system where all aspects of the SAN and file sharing system are included in a single solution. These turn-key systems include all required hardware and software in the solution. A disadvantage of this system is that it is typically expensive, since there is no competition for individual components of the system. Another disadvantage is the difficulty in scaling the system. Again, with only a single source of equipment, scaling the system is expensive.

Another current approach to providing a storage solution is to use generic file sharing software to control the hardware system. In this technique, the generic software is written to have the most basic storage protocols to maximize the potential compatibility with multiple hardware systems. This solution is typically done at the client/server and/or the OS level with whole file formats being written to provide file sharing for whatever storage is attached. A disadvantage of the generic software approach is the difficulty of setting up and maintaining the system. There is no specific control or optimization for whatever hardware is being used. If a particular piece of hardware doesn't work with the system, the only solution is to use some other hardware or to revise the code of the generic software. The disadvantage is continuous revising, lack of optimization, compromised performance, and still with limitations on hardware choices. Another disadvantage is that scalability is not guaranteed.

An alternate prior art approach is so-called "generic protocols". This is the use of generic protocols such as SCSI to provide file sharing layer so that the storage has to adapt to the protocol for compatibility. Another approach is the NAS system built into Ethernet. This approach has the disadvantage of not being optimized for performance with a particular hardware setup. It also lacks guaranteed scalability. Another problem is that block data needs to be translated into the generic protocol, adding a layer of complexity and lowering performance.

SUMMARY OF THE INVENTION

The system utilizes a plurality of layers to provide a robust storage solution. One layer is the RAID engine that provides parity RAID protection, disk management and striping for the RAID sets. The second layer is called the virtualization layer and it separates the physical disks and storage capacity into virtual disks that minor the drives that a target system requires. A third layer is a LUN (logical unit number) layer that is disposed between the virtual disks and the host. By using this approach, the system can be used to represent any number, size, or capacity of disks that a host system requires while using any configuration of physical RAID storage. In one embodiment the system provides dynamic configuration of the storage system depending on the requirements of the host system. When the system is connected to a host system or when a request is provided for certain parameters from a program, the system will retrieve the parameters and configure itself accordingly so that the requesting software has what it requires to use the storage it is requesting. The embodiment includes a feedback loop to be able to change the parameter controls between the virtualization layer and the LUN layer depending on information derived from the host system.

DETAILED DESCRIPTION OF THE PREFERRED EMBODIMENTS

The system provides a system that allows the logical creation of virtual disks that can be accessed by a host system. The system is disposed between a RAID array and a host computer and is implemented in the firmware of a RAID controller. The system is flexible and scalable. The system allows the entry of parameters in the firmware layers that are identical to whatever parameters are required by an application and/or operating system. In this manner, the system is always optimized for the configuration that it is in, but without extensive original programming required. The system can use pre-defined standard or custom parameters but mirrors them in the virtual disk environment to provide compatibility with any system. The system can provide custom block sizes, access times, sector size, scanning size, mode pages and any other parameters to simulate an actual real disk that a piece of software or application would need to see for optimized performance.

The host system believes it is coupled to a block-level storage unit, either in fibre channel SCSI or some other protocol. The host system sees what to it is one or more individual hard drives. However, the actual drives may be RAID array drives in the system.

Figure 1:
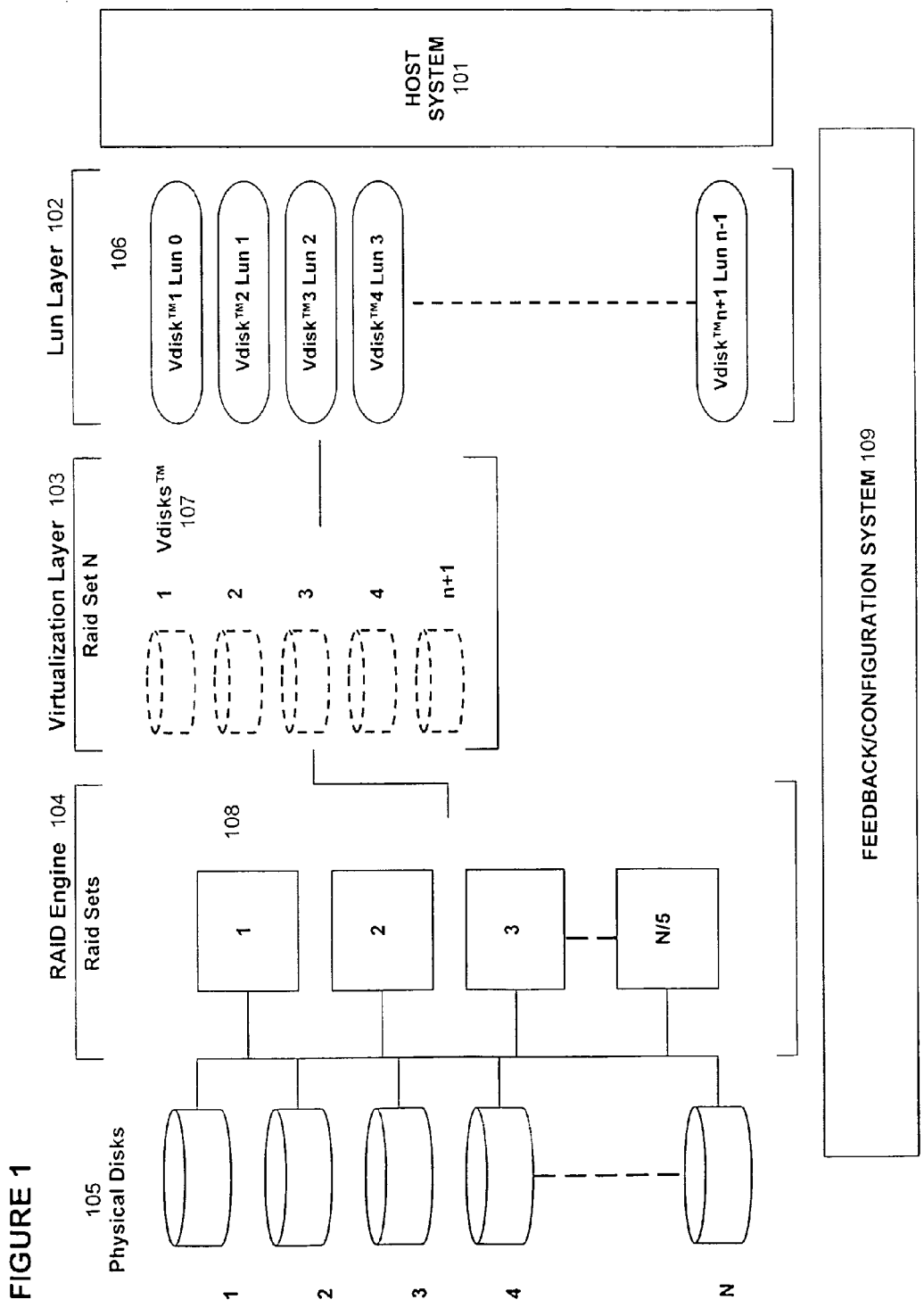
FIG. 1 is a flow diagram illustrating an embodiment of the invention.

FIG. 1 illustrates one embodiment of the system. The system is shown coupled to a host system 101. The host system 101 has storage requirements and utilizes some set of parameters for storage read/write and control. The host system 101 may comprise an operating system and/or one or more applications that require storage.

The storage system uses three layers, the LUN layer 102 that presents a plurality of virtual disk logical unit numbers 106 to the host system. The LUN layer 102 is coupled to the virtualization latter 103. The LUN layer provides a level of control for compatibility. Each Vdisk can be directed to a LUN or a series of LUNs which are then directed to the appropriate port of the host system 101.

The virtualization layer 103 presents a set of virtual disks 107 to the LUN layer 102. The virtual disks 107 are mapped to the virtual disk LUNs 106 of the LUN layer 102. The virtualization layer 103 may represent a RAID array such as shown consisting of disks 1, 2, 3, 4 to disk n+1. The virtualization layer divides each RAID set into Vdisks that mirror the drives that the host system requires. All parameters, such as block size, firmware, mode pages, and other parameters are configurable or dynamic.

Although shown as a RAID array, the virtualization layer 103 can be implemented in any manner, even as one or more volumes that may or may not be part of a RAID array. The virtualization layer can be dynamically reconfigured on the fly to provide the appropriate storage parameters of the requesting application or operating system.

The virtual RAID array of virtualization layer 103 is coupled to the RAID engine 104 that includes a plurality of RAID sets 108 labeled 1-N/5 in the embodiment of FIG. 1. The RAID engine 104 provides XOR parity RAID protection, disk management, and striping of the physical RAID array 105. In one embodiment, RAID level 5 is the minimum RAID level requirement for the RAID sets. Drives are striped in sets of 5. All standard RAID parameters are available and block size for striping is dynamic.

The virtualization layer 103 is able to emulate any type of storage solution with the only constraint being the physical capabilities of the underlying RAID engine 104 and physical disks 105. The available storage volume of the virtualization layer cannot exceed the total storage available in the RAID array 105. Although illustrated as a RAID array, the physical storage layer may be implemented in any desired manner. In addition, even though the system is described in conjunction with the use of disk storage at the physical layer, the physical layer may be implemented as any suitable storage medium, including other moving media devices, or other schemes such as solid state memory devices, without departing from the scope and spirit of the system.

The feedback/configuration layer 106 is used to configure the LUN layer 102, virtualization layer 103, RAID engine 104, and physical disks 105 depending on the protocol and format requirements of the memory requester.

The system is transparent to the host system. The host system sees LUN drives and block level access even though there are multiple layers between the host and the physical disks themselves. The system is also infinitely scalable, because the number of disks that the system sees or wants is completely configurable in the virtual and LUN layers. The only requirement is to add sufficient physical RAID storage to support the host requirements. Because the system uses parameters as required by each host or application, optimization is taken care of automatically. There is no generic software that is a compromise for most systems. Further, by not requiring a generic protocol, the system again can be optimized for the intended use. Finally, because the system is open and configurable, it is superior to turnkey systems because it can use any physical storage and is not locked in to a proprietary system. This allows users to scale in an economical fashion.

All storage access from the host 101 to storage are made to the LUN layer 102 and virtualization layer 103. Data is written by the host 101 to the LUN layer 102 and data is read by the host 101 from the LUN layer 102.

Operation

Figure 3:
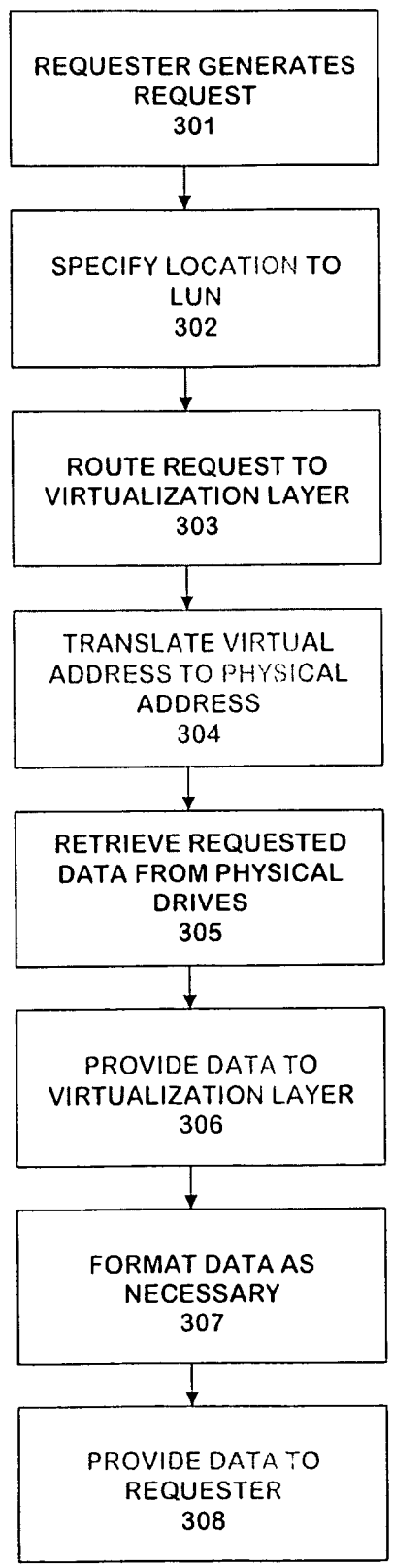
FIG. 3 is a flow diagram illustrating operation of an embodiment of the system.

FIG. 3 is a flow diagram illustrating operation of the system in one embodiment. At step 301, a memory requester generates a memory access request (e.g. a read operation). At step 302 the requester specifies the location of the data to be retrieved and sends the request to the LUN layer 102. At step 303 the LUN layer routes the request to the virtualization layer 103. At step 304 the virtualization layer 103 translates the virtual address location to a physical address that it sends to the RAID engine 104.

The RAID engine 104 retrieves the requested data from the drives at step 305. At step 306 the data is provided to the virtualization layer 103. At step 307 the virtualization layer 103 formats the data as necessary to satisfy the storage parameters in use. This may include changing the block size, etc. At step 308 the data is provided by the virtualization layer 103 to the LUN layer 102 and ultimately, to the requester on host 101.

Dynamic Configuration

One advantage of the system is the ability to configure the virtualization layer 103 depending on the requirements of the operating system and/or applications that are accessing storage. In one embodiment the system includes automatic parameter setting. When it is connected to a host system or when a request is provided for certain parameters from a program, application, or operating system, the system will retrieve the parameters and configure itself accordingly so that the requester has what it requires to use the storage it is requesting.

Figure 2:
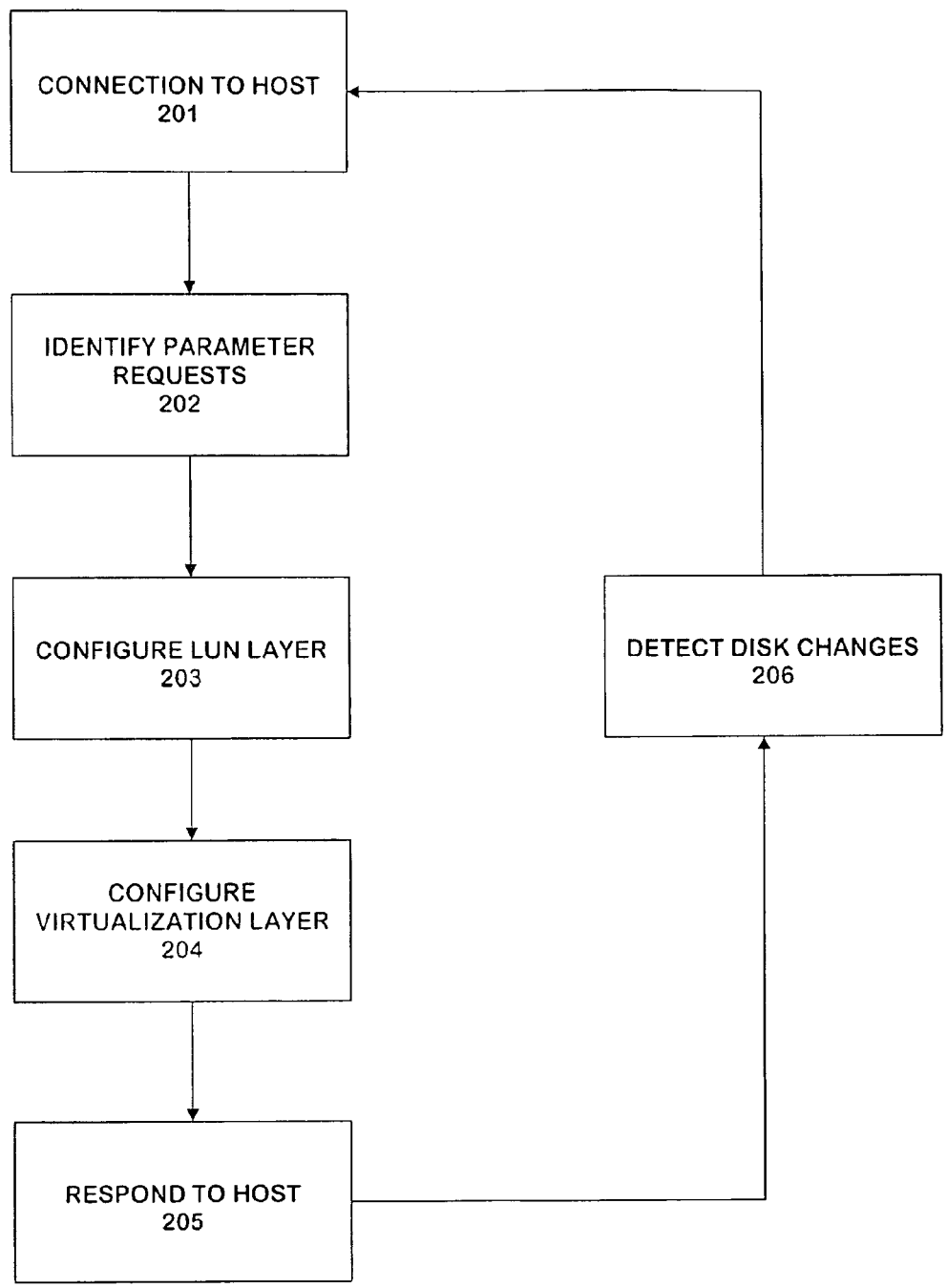
FIG. 2 is a flow diagram of the operation of an embodiment of the system.

FIG. 2 is a flow diagram illustrating the dynamic operation of one embodiment of the system. At step 201 a connection to a host is initiated and a storage request is made. The storage request includes the parameters required by the storage requester. The parameters may be based on a particular disk file system used by the requester, such as disk file systems include FAT (FAT12, FAT16, FAT32), NTFS, HFS and HFS+, ext2, ext3, ISO 9660, ODS-5, and UDF. Some disk file systems are journaling file systems or versioning file systems. The parameters needed by the requester can sometimes be found in metadata accompanying the request.

At step 202 the system identifies the parameters of the request and determines if any reconfiguration is required. This can be accomplished by reading any associated metadata for the block size, volumes, rootmap, etc. At step 203 the system configures the LUN layer pursuant to the necessary parameters. This could be in response to a request that has parameters for a fibre channel protocol, a SCSI protocol, APA protocol, or any other or future protocol that defines its needed parameters. At step 204 the system configures the virtualization layer if necessary to match up with the protocol request. At step 205, the system responds the host request appropriately so that the host can now use the storage as it prefers.

In one embodiment the system is configured dynamically via a feedback system 109 where information about drive changes from the host is used to reset parameters in the system. For example, after the system responds to the host at step 205, the system detects drive changes at block 206 and returns to step 202 where parameter settings are identified and changes to the parameters are made.

Figure 4:
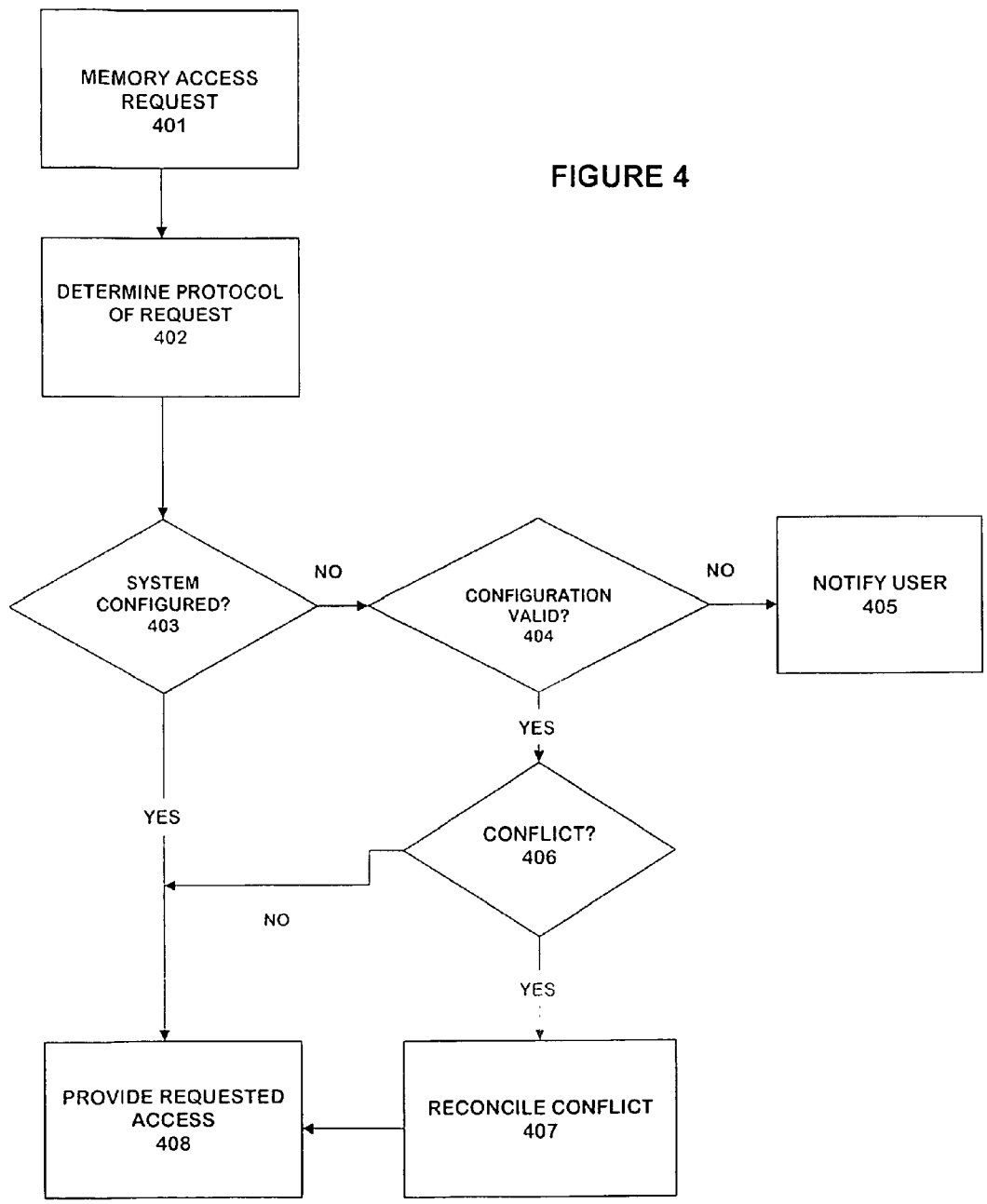
FIG. 4 is a flow diagram illustrating the feedback operation of the system in one embodiment.

FIG. 4 is a flow diagram illustrating the feedback operation of the system in one embodiment. At step 401 the system receives a memory access request. At step 402 the system checks the request to see the protocol format of the request. At step 403 the system determines if the storage is already configured in the manner requested.

If not, the system proceeds to step 404 to determine if it is possible to configure the memory as requested (e.g. does not exceed block size limitations, total storage limitations, etc.). If not, the system notifies the user at step 405.

If the requested configuration is valid at step 404, the system checks to see if the configuration will result in any conflicts with existing usage. For example, the host could have drives connected at LUNs zero and ten already, and the new request might conflict with that assignment. If there is a conflict, the system reconciles the conflict at step 407. This could be the reassignment of LUN volumes temporarily to allow the desired access.

If the system is already configured at step 403, or if there is not conflict at step 406, or after the reconciliation at step 407, the system proceeds to step 408 and provides the requested memory access.

Thus, a configurable and scalable memory system is provided.

I claim:

1. A method for providing dynamically optimized configurations of storage in response to a memory access request from a host system, comprising:
   receiving a request from the host system for access to memory with a particular protocol and file system;
   determining the protocol and file system type of the memory for which access is requested;
   determining a set of parameters based on the requested protocol and file system;
   determining if the set of parameters is compatible with at least a portion of a memory accessible by a server;
   dynamically configuring an abstraction layer in accordance with the set of parameters if the parameters are incompatible with at least a portion of the memory accessible by the server, the set of parameters used during the dynamic configuration of the abstraction layer to simulate a non-block level file protocol that is presented to a requesting software program or application to access the memory for optimized performance;
   coupling the abstraction layer to a physical storage system and,
   dynamically optimizing the configuration of the non-block level file protocol so as to be compatible with the set of parameters.

2. The method of claim 1 wherein the physical storage system comprises a remote data storage system.

3. The method of claim 1 further including the step of reconciling conflicts with a prior request when dynamically configuring.

4. A system for providing dynamically optimized storage in response to a memory access request from a host system, comprising:
   an abstraction layer associated with a memory residing on a server in communication with a host system, the abstraction layer being dynamically configured by the server to be compatible with a set of parameters determined from a requested memory access received from the host system, the set of parameters used during dynamic configuration of the abstraction layer to simulate a non-block level file protocol needed by a software program or application to access the memory for optimized performance;
   a virtualization layer comprising virtual memory coupled to the abstraction layer, the virtualization layer being automatically optimized in accordance with the parameters; and
   a storage system coupled to the virtualization layer.

5. The system of claim 4 wherein the storage system comprises a remote data storage system.

6. The system of claim 4 wherein conflicts are reconciled with a prior request when dynamically configuring.

7. A method for dynamically arranging configurations of a storage device to ensure compatibility with parameters determined from a memory access request by a host system, comprising:
   receiving a memory access request from a host system at a server;
   determining a protocol and file system type of the memory for which access is requested;
   determine a set of parameters based on the requested protocol and file system;
   simulating a non-block level protocol in accordance with the parameters, the simulated protocol providing optimized performance for the memory requested memory access;
   coupling the simulated non-block level protocol to a physical storage system and,
   dynamically arranging the configuration of the non-block level protocol depending on the parameters.

8. The method of claim 7 wherein the configuration of the non-block level protocol results in configuration of at least one of the following: a fiber channel protocol, a APA protocol, a packet protocol, a token protocol, a data transport protocol, or a file based protocol.

\* \* \* \* \*